United States Patent [19]
Giddey et al.

[11] Patent Number: 4,525,372
[45] Date of Patent: Jun. 25, 1985

[54] LIGHT CONDIMENT HAVING A MUSTARD BASE AND A PROCESS FOR ITS PREPARATION

[75] Inventors: Claude Giddey, Geneva; Georges Dové, Carouge, both of Switzerland

[73] Assignee: Battelle Memorial Institute, Carouge, Switzerland

[21] Appl. No.: 593,642

[22] Filed: Mar. 26, 1984

[30] Foreign Application Priority Data

Mar. 25, 1983 [CH] Switzerland ........................ 1651/83

[51] Int. Cl.$^3$ .......................... A23L 1/225; A23L 1/22
[52] U.S. Cl. ..................................... 426/564; 426/568; 426/573; 426/650; 426/576; 426/577

[58] Field of Search .............. 426/564, 568, 650, 576, 426/573, 577

[56] References Cited

U.S. PATENT DOCUMENTS

| | | | |
|---|---|---|---|
| 2,217,699 | 10/1940 | Musher | 426/568 |
| 3,728,133 | 4/1973 | Norris | 426/568 |
| 3,852,488 | 12/1974 | Yoda | 426/650 |
| 4,244,982 | 1/1981 | Menzi et al. | 426/568 |

*Primary Examiner*—Jeanette M. Hunter
*Attorney, Agent, or Firm*—Karl F. Ross; Herbert Dubno

[57] ABSTRACT

A light condiment having a mustard base and in the form of a mousse is disclosed as well as a process for the preparation thereof. The mousse has a density of less than or equal to 0.9.

11 Claims, No Drawings

LIGHT CONDIMENT HAVING A MUSTARD BASE AND A PROCESS FOR ITS PREPARATION

FIELD OF THE INVENTION

The present invention relates to a seasoning or light condiment having a base of ground mustard, vinegar, and water as well as a process for the preparation thereof.

BACKGROUND OF THE INVENTION

Condiments based on mustard are utilized principally in continental Europe and those preparations familiarly named mustard are generally constituted by grains of ground mustard in a flour (this flour may or may not be degreased), the grains being dispersed in aromatized vinegar in most cases. The mixture is then subjected to enzymatic fermentation for liberating the active principle (allyl isothiocyanate), then finally homogenizing and pulverizing the product until a more or less homogeneous paste takes place. This type of "mustard" is indeed distinguishable from dry, powdered mustard, utilized especially in Anglo-Saxon countries in which an aroma develops only upon mixing with water just before use.

The condiment "mustard" actually on the market (which includes diverse categories: sweet table mustard, medium strength mustard, strong mustard, mustard with horse radish, Dijon mustard, etc., according to the species of mustard grains and the additives) is a product having a density of about 1 and whose storage stability is not always exemplary. In some situations, the mustard tends to form distinct phases, a solid phase and a liquid phase, making same not very appetizing.

There have been many attempts to remedy this problem in commerce and simultaneously to produce a product with low density in accordance with the actual principles of other light products, such as caramel mousses, yogurt mousses.

OBJECT OF THE INVENTION

It is the object of the invention to provide a seasoning or light condiment having a mustard base, that is both appetizing as well as stable for a long period of time.

SUMMARY OF THE INVENTION

The mustard-based seasoning or light condiment of the invention is characterized by including in a dispersed state, an inert gas or air giving it a mousse structure and a density less than or equal to 0.9.

In order to facilitate the formation of the mousse, the condiment contains preferably, a foaming or swelling agent, for example egg whites in powdered form, or the extracts of polypeptides such as the hydrolysates of caseine, gluten, soy or other substances capable of forming a mousse or foam by heating in the presence of air, or in any other gas, especially an inert gas such as nitrogen. The quantity of foaming agent should preferably be between 0.5 and 2% by weight of the condiment before the foam-forming but these quantities are not critical, and may be exceeded. In order to stabilize the mousse or foam during storage, the condiment can also contain stabilizing agents such as gelatin, pectine, propylene glycol alginate and others. The amount by weight of the stabilizing agent is between 1 and 3.5 weight percent of the total mixture before swelling. Of course besides the additives already mentioned, the mousse or foam can contain other additives currently used in mustard, especially salt, sugar, and diverse organoleptic adjuvants such as pepper, horse radish, celery, spices, diverse aromatics.

In order to prepare the mustard foam or mousse according to the invention, one can start with commercial mustard, that is the condiment in paste form, to which is added, with agitation, and in succession, the stabilizing agent and then the foaming agent, preferably in aqueous solution. When the foaming agent is added, this can already influence the state of the mousse. However, where the influence has not taken place, the mixture is mechanically beaten. Preferably mustard is utilized which contains a quantity of water which is less than the usual 85-90%. This way the smaller amount of water is compensated for by the aqueous solution of the foaming or swelling agent. As the foaming or swelling agent, one can advantageously use egg albumin. The product known as "Hyfoama" of the Society Lederinck in Holland or the product known as "Biambel" of the Society Bel Industries in Paris are also suitable.

Preferably the temperature of the stabilizer is adjusted to a higher ambient temperature, for example between 40°–70° C. Concerning the foaming or swelling agent, this is added preferably at an ordinary temperature, or instead at a slightly refrigerated temperature, that is at a temperature of 5° to 70° C., preferably between 10° to 20° C.

After addition of the foaming or swelling agent, and if previously the mixture has not already been beaten, the mixture is subjected to a beating by incorporation of air or an inert gas, for example nitrogen, until the desired density is obtained, for example a density of 0.7 to 0.9. The beating is performed according to the usual method preparing a mousse or foam (Creme Chantilly for example), or according to an industrial swelling method, and continued.

Thus the mousse obtained in unctuous, light, and generally and distinctly more savory than the original mustard and has an excellent storage stability. In effect, after six weeks, or even after six months of storage on a shelf, there is no apparent tendency to separate into two phases, which is surprising according to the state of the art (see for example U.S. Pat. No. 4,244,982) according to which certain foods in the form of a mousse or foam containing "Hyfoama" as a foaming agent, rapidly lose their aerated structure during storage.

The mustards suitable for the fabrication of the aerated condiment include a wide variety. That is, the present process is applicable to Dijon mustards [containing essentially brown mustard *Brassica nigra*], to strong mustards, to mustards of medium strength, to mustards containing horse radish, as well as to sweet table mustards which contain principally white mustard (*Sinapsis alba*). The foaming or swelling agents based on hydrolysates of proteins are most convenient for the fabrication of mousses or foams of strong mustards. For the sweet mustards, egg albumin is the most suitable foaming agent.

The commercial compositions of mustards utilized as mentioned above generally comprise 18-35% by weight mustard seed. Where white mustard is concerned, the grains must be first processed to remove the hulls (30-40%), then the "cake" is pulverized and then dispersed in vinegar for aging. Where dark mustards are concerned (e.g. Dijon mustard), the grains are directly ground in vinegar. The amount of the vinegar (acetic acid content) is about 1.5 to 4% by weight of the composition (50–70% water).

After aging, that is to say, enzymatic liberation of the principal aromatizing agents, one discharges (especially in the case of the Dijon mustards), the fibrous residues arising from the shells or the grains. Alternatively these shells are ground between stone grinding wheels. Then the remaining additives are included, specifically salt (1–7%), sugar, and where desired, other aromatizing agents or spices, the quantity of these being generally equal to or less than 0.5%; then the whole mixture is homogenized in order to obtain a commercial mustard.

The following examples illustrate the invention without specifically limiting the same.

EXAMPLE 1

A commercial mustard is utilized of the Dijon type where the amount of water present is about 10% less than the normal amount.

The mustard has the following composition:
Ground *Brassica nigra:* 32%
Vinegar: 17%
Salt: 7%
Tartaric Acid: 0.6%
Water: 43.4%

To 1 kg of this mustard, one adds at 60° C., without agitation, that is holding the mixture still, 2.0 g of gelatine as a stabilizer, in such a manner as to obtain Solution A. Separately, one dissolves 1.2 g of Hyfoama (calcium caseinate partially enzymatically hydrolyzed) in 80–90 ml of water in such a manner as to obtain a solution B. Next Solutions A and B are mixed at a temperature of 20°–60° C. Then the mixture is placed in a beater for Creme Chantilly and the beating process is carried out at ambient temperature, with introduction of air until obtaining a mousse of density=0.75.

The mousse has a color clearer than that of the original mustard and its taste is more "round" and more savory (although more intense than that of the original mustard). At the end of several days of storage, there is no decrease in the global volume of the mass, and the air bubbles have dimensions of the order of 0.5 to 2–3 mm in diameter. Thus the mousse is entirely stable in this form and no change of flavor was detected over the six week period following the preparation.

EXAMPLE 2

One proceeds as in Example 1 using the same proportions of the same active ingredients. The ground mustard (degreased) comes from dark and white mustard grains in an approximate ratio of 1:4. As stabilizing additive, one uses 1 kg of a mixture containing the following basic ingredients: 1 g of gelatine and 0.3 g of glycerol. Then 1.2 g of Hyfoama are added and the mixture is beaten with air until obtaining a density of 0.73.

EXAMPLE 3

One repeats the procedure of Example 1 and utilizes exactly the same ingredients in the identical proportions except that the foaming or swelling agent is here constituted by 1.2 g of Biambel 170. After beating in the presence of air, a mousse is obtained having a density of 0.76 having both excellent storage stability and taste.

EXAMPLE 4

One proceeds exactly as in Example 1 with the only difference being the replacement of 2 g of gelatine by 0.1 g of apple pectine. After beating, an unctuous mousse is obtained having a density of 0.77 and stable upon storage.

EXAMPLE 5

A medium strength mustard of the following composition is used:

| | |
|---|---|
| Water | 48.7% by weight |
| Vinegar | 19.8 |
| White Mustard | 22.3 |
| Salt | 4.7 |
| Black Mustard | 4.0 |
| Aromatics | 0.5 |
| | 100% |

During the fabrication of the composition described above, one adds 0.5% by weight of pectin as a stabilizer at a temperature between 40°–70° C.

Separately, one prepares an aqueous solution of egg albumin by dispersing and dissolving under agitation 16 kg of albumin powder in 84 liters of water. Then this solution is introduced at a rate of 650 ml/min in an industrial swelling machine REN (Ravanetti Parme, Italy), into which one simultaneously injects 40 liters of air per minute at a pressure of 3 bars. Then one obtains a swelling agent which itself is in the form of a mousse having a density of 0.05. Then, one adds via separate conduits the foaming agent and the mustard composition to a mixer using deflecting baffles (type Erestat, Xyzet, Germany), maintained at ambient temperature. The two phases are then rejoined in a common tube leading to the mixer. After mixing, a mustard mousse having a density of 0.70 forms at a rate of 21.5 l/min. The obtained mustard mousse is then conditioned in pots of a conditioning medium and divided into portions of 500 ml.

The mustard mousse is stored for 6 months or more at ordinary temperatures without any modification in its density or organoleptic properties.

We claim:

1. A seasoning or light condiment in the form of a mousse which comprises:
   (a)
   (i) grains of ground mustard in an amount of 18 to 35% by weight of the total composition of the condiment;
   (ii) vinegar amounting to 1.5 to 4% by weight of the total composition of the condiment in terms of acetic acid content; and
   (iii) water amounting to 50 to 70% by weight of the total composition of the condiment; and which further comprises:
   (b)
   (i) an effective amount of a foaming or swelling agent;
   (ii) an effective amount of a stabilizing agent; and
   (iii) an inert gas or air dispersed throughout the condiment in such a manner that the density of the mousse is less than or equal to 0.9.

2. The seasoning or light condiment defined in claim 1 further comprising additional seasonings or organoleptic agents.

3. The seasoning or light condiment defined in claim 1 wherein the foaming agent is egg albumin and the stabilizing agent is gelatine, pectine or an alginate.

4. A process for the preparation of a seasoning or light condiment in the form of a mousse which comprises the steps of:
  (a) stabilizing a commercial mustard which comprises:
    (i) grains of ground mustard in an amount of 18-35% by weight of the total composition of the condiment;
    (ii) vinegar amounting to 1.5 to 4% by weight of the total composition of the condiment, in terms of acetic acid content; and
    (iii) water amounting to 50 to 70% by weight of the total composition of the condiment, with an effective amount of a stabilizing agent at a temperature of 40° to 70° C. to form a mixture;
  (b) treating the mixture formed during step (a) at a temperature of 10° to 70° C. with a foaming or swelling agent, and
  (c) beating the mixture in the presence of air or an inert gas to obtain a mousse having a density less than or equal to 0.9.

5. The process defined in claim 4 wherein step (c) is carried out after introduction of the foaming agent to the mixture of the mustard and the stabilizing agent.

6. The process defined in claim 4 wherein the foaming agent is itself in the form of a mousse.

7. The process defined in claim 4 wherein the foaming agent is egg albumin.

8. The process defined in claim 4 wherein the stabilizing agent is selected from the group consisting of gelatin, pectine, and alginates.

9. The process defined in claim 4 wherein the foaming agent is selected from the group consisting of hydrolysates of caseine, soy proteins, and gluten.

10. The process defined in claim 4 wherein the total weight of the condiment composition comprises 1 to 3.5% by weight of the stabilizing agent and 0.5 to 2% by weight of the foaming agent, before foaming or swelling.

11. The process defined in claim 4 wherein the foaming agent is added at a temperature of 10°-20° C.

* * * * *